US006978318B1

(12) United States Patent
Keller et al.

(10) Patent No.: US 6,978,318 B1
(45) Date of Patent: Dec. 20, 2005

(54) NETWORK INTERFACE APPARATUS AND METHOD OF INTERNAL COMMUNICATION WITHIN THE SAME

(75) Inventors: Philip J. Keller, Fremont, CA (US); Yatin R. Acharya, Sunnyvale, CA (US); Matthew J. Fischer, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 613 days.

(21) Appl. No.: 09/597,371

(22) Filed: Jun. 19, 2000

(51) Int. Cl.[7] ............................................. G06F 15/16
(52) U.S. Cl. ..................... 709/250; 709/227; 709/236; 709/253
(58) Field of Search ................................ 709/217, 227, 709/230, 232, 236, 246, 249–250, 201–202, 709/253

(56) References Cited

U.S. PATENT DOCUMENTS

| | | |
|---|---|---|
| 5,361,261 A | 11/1994 | Edem et al. |
| 5,465,364 A | 11/1995 | Lathrop et al. |
| 5,548,731 A | 8/1996 | Chang et al. |
| 5,606,559 A | 2/1997 | Badger et al. |
| 5,784,573 A | 7/1998 | Szczepanek et al. |
| 5,802,073 A | 9/1998 | Platt |
| 5,892,768 A | 4/1999 | Jeng |
| 5,963,595 A | 10/1999 | Graham et al. |
| 5,974,051 A | 10/1999 | De Nicolo et al. |
| 5,978,853 A | 11/1999 | Crayford et al. |
| 5,995,514 A | 11/1999 | Lo |
| 6,011,799 A | 1/2000 | Kerstein et al. |
| 6,088,723 A * | 7/2000 | Shim ........................ 709/217 |
| 6,229,817 B1 * | 5/2001 | Fischer et al. .............. 370/445 |
| 6,289,386 B1 * | 9/2001 | Vangemert .................. 709/250 |
| 6,456,629 B1 * | 9/2002 | Bjorkqvist et al. ......... 370/466 |
| 6,459,705 B1 * | 10/2002 | Cheng ........................ 370/463 |
| 6,516,352 B1 * | 2/2003 | Booth et al. ................ 709/250 |
| 6,535,521 B1 * | 3/2003 | Barghouti et al. .......... 370/462 |
| 6,571,291 B1 * | 5/2003 | Chow ......................... 709/230 |
| 6,581,113 B1 * | 6/2003 | Dwork et al. ................ 710/52 |
| 6,662,234 B2 * | 12/2003 | Cheng ........................ 709/250 |
| 6,834,313 B1 * | 12/2004 | Gaspar et al. .............. 709/250 |

OTHER PUBLICATIONS

U.S. Appl. No. 09/597,370, filed Jun. 2000, Acharya et al.
U.S. Appl. No. 09/597,372, filed Jun. 2000, Acharya et al.
U.S. Appl. No. 09/597,373, filed Jun. 2000, Vo et al.
U.S. Appl. No. 09/597,374, filed Jun. 2000, Keller et al.
U.S. Appl. No. 09/597,375, filed Jun. 2000, Vo et al.

* cited by examiner

Primary Examiner—Bharat Barot
(74) Attorney, Agent, or Firm—Renner, Otto, Boisselle & Sklar, LLP

(57) ABSTRACT

A network interface includes a network medium interface operatively coupled to a software device driver arrangement, with a legacy media access controller (MAC) therebetween. The device driver arrangement includes a legacy MAC device driver configured to communicate with the legacy MAC, and an intermediate driver configured to communicate with the network medium interface. The intermediate driver and the network medium interface may communicate with one another by use of special frames, for example to send and receive control information. The special frames are formatted to pass through the legacy MAC, and include an identifier so that they can be identified at the intended destination, either the intermediate driver or the network medium interface. Upon identification, the control information is extracted at the destination. The network medium interface may include one or more MACs as well as one or more physical layer devices (PHYs).

25 Claims, 2 Drawing Sheets

NETWORK INTERFACE APPARATUS AND METHOD OF INTERNAL COMMUNICATION WITHIN THE SAME

BACKGROUND OF THE INVENTION

1. Technical Field of the Invention

The present invention generally relates to network interfaces and means for internal communication and control within network interfaces.

2. Description of the Related Art

Network interfaces for connecting a device, such as a computer, to a network, commonly include a media access controller (MAC). The MAC ensures that data being sent is properly formatted and addressed frames or packets, so that the frames or packets are properly recognized by other computers on the network. Signals from the MAC are sent to a physical layer (PHY) which handles the actual transmission of signals on the network medium. The network medium may be any of a variety of well known media, such as fiber-optic cables or various types of dedicated metal-wire cables such as twisted shielded pair, 10 BASE-T, and wiring for telephone lines. Alternatively, the network medium may include wireless communication.

Software drivers are used to facilitate communication between the MAC and operating systems or application programs on the computer. Such device drivers translate the functions desired by the operating system or applications program into a form usable by the MAC. Such software device drivers are generally device specific, that is, a device driver for use with one MAC may often not be usable with a differently-designed MAC.

At times it may be desirable to incorporate a new physical layer device into a network interface card or other network interface which already contains a MAC. For example, it may be desirable to take a card or system having a MAC and PHY for connecting to one type of network medium, and modify it to be able to connect to an additional type or types of network media. A new device driver may be written to control such a hybrid system. However, writing new device drivers for each type of existing MAC involves considerable effort and expense.

From the foregoing it will be understood that it would be desirable to have improved means of making network interfaces utilizing existing MACs.

SUMMARY OF THE INVENTION

A network interface includes a network medium interface operatively coupled to a software device driver arrangement, with a legacy media access controller (MAC) therebetween. The device driver arrangement includes a legacy MAC device driver configured to communicate with the legacy MAC, and an intermediate driver configured to communicate with the network medium interface. The intermediate driver and the network medium interface may communicate with one another by use of special frames, for example to send and receive control information. The special frames are formatted to pass through the legacy MAC, and include an identifier so that they can be identified at the intended destination, either the intermediate driver or the network medium interface. Upon identification, the control information is extracted at the destination. The network medium interface may include one or more MACs as well as one or more physical layer devices (PHYs).

According to an aspect of the invention, a method of internal communication within a network interface includes creating special frames or packets within one part of the network interface and receiving and identifying the special frames or packets in another part of the network interface. The special frames or packets may have a format similar to other frames or packets sent and received along the network by the network interface. The special frames or packets may include an identifier to distinguish them from the other frames or packets sent and received.

According to another aspect of the invention, a network interface includes a first media access controller (MAC) and a network medium interface, the network medium interface including at least one additional MAC and at least one physical layer device (PHY).

According to yet another aspect of the invention, a network interface apparatus includes means for creating and receiving special frames or packets for internal communication.

According to still another aspect of the invention, a method of communicating within a network interface apparatus includes the steps of (i) creating special frames in a first part of the apparatus, the special frames including an identifier that distinguishes them from other frames passing through the apparatus; (ii) sending the special frames from the first part to a second part of the apparatus through at least a media access controller of the device; and (iii) identifying the special frames from among frames incoming to the second part, the identifying including examining the incoming frames for the presence of the identifier.

According to a further aspect of the invention, a network interface apparatus includes a network medium interface, a media access controller operatively coupled to the network medium interface, and a driver arrangement operatively coupled to the media access controller, the device driver arrangement including a device driver operatively configured to communicate with the media access controller, and an intermediate driver operatively configured to communicate control information to the network medium interface.

According to a still further aspect of the invention, a network interface apparatus includes a network medium interface, a media access controller operatively coupled to the network medium interface, a device driver operatively configured to communicate with the media access controller, and means for controlling the network medium interface by passing control information through the media access controller.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
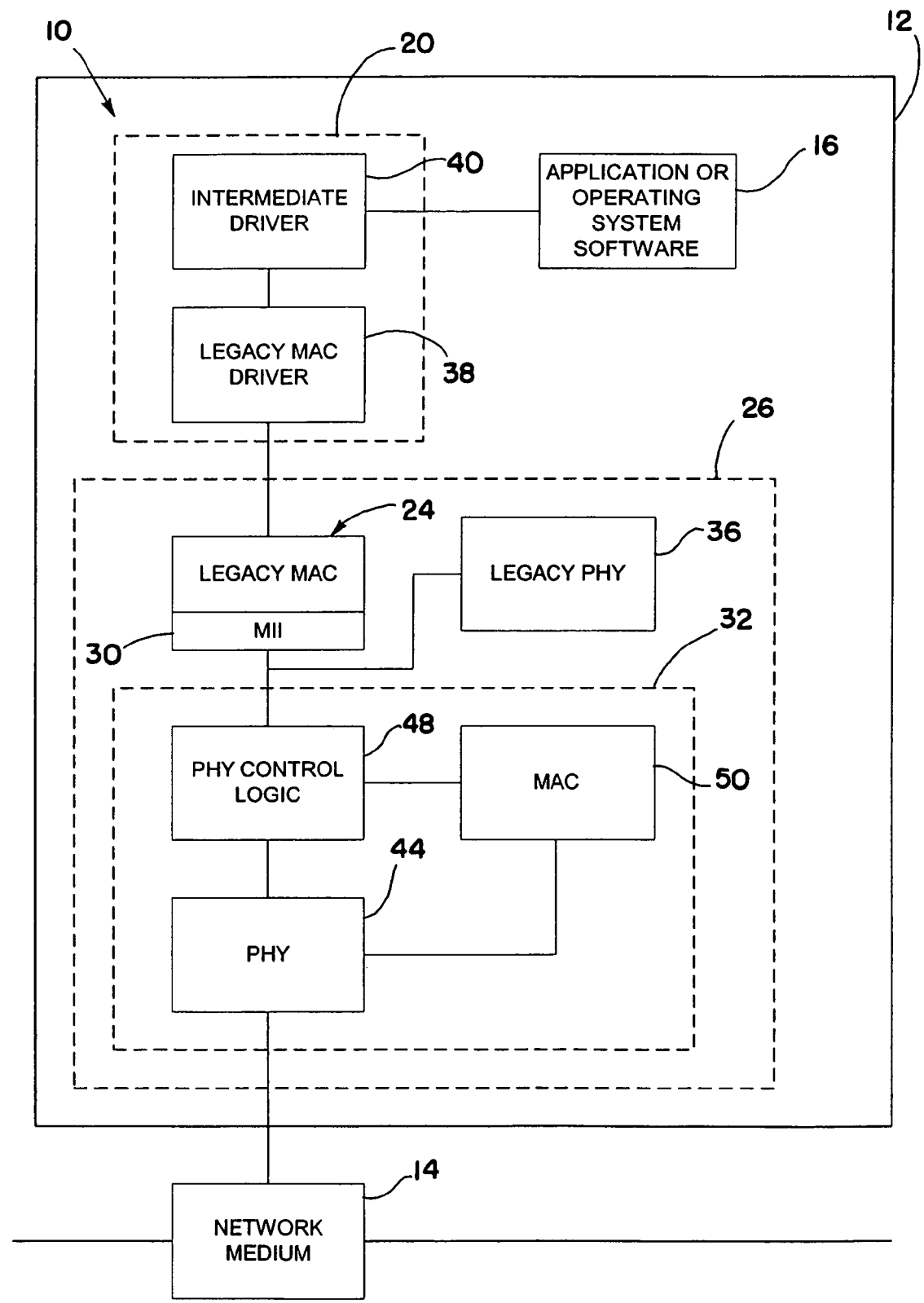
FIG. 1 is a block diagram of a network interface in accordance with the present invention.

Referring initially to FIG. 1, a block diagram of a network interface apparatus 10 (also referred to as a network interface) is shown. The network interface 10 is a means for connecting a host computer 12 to a network medium 14. In the host computer 12, data from operating system or application software 16 is received and processed by a software device driver arrangement 20.

The operating system or application software 16 creates data and notifies a driver interface that data is waiting to be sent to a specific node of the network. The intermediate driver interface may reformat the data as necessary, and sends the data to the device driver arrangement 20 via a defined interface, for example via an interface following the NDIS (Network Driver Interface Specification) or ODI (Open Data-link Interface) specifications. The device driver arrangement 20 may reconfigure the data into a format compatible with the interface devices downstream toward the network medium 14, and may create and add header information such as source and destination addresses, and data transmission speed. The device driver arrangement 20 may also divide data from the software 16 into frames or packets of suitable length.

The frames or packets pass from the device driver arrangement 20 to a legacy media access controller (MAC) 24. The legacy MAC 24 may be part of a network interface card 26 which is installed in the host computer 12. The MAC 24 may prepend or append additional information to packets received from the device driver arrangement 20. For example, the MAC may calculate and append some form of frame check sequence (FCS), such as a cyclic redundancy check (CRC), to the frames or packets.

The legacy MAC 24 includes a media independent interface (MII) 30 operably coupled to a network medium interface 32. The MII 30 is capable of passing data and other information between the legacy MAC 24 and the network medium interface 32. The legacy MAC 24 may also be coupled to a legacy physical device (PHY) 36, the legacy PHY being configured for interfacing a network medium of a type different from the network medium 14.

The terms "media independent interface" and "MII" as used herein, are intended to include variations on the standard MII, such as the reduced media independent interface (RMII) and the serial media independent interface (SMII).

As described in greater detail below, the software device driver arrangement 20 and the network medium interface 32 have the capability of exchanging control or other information by the use of special packets or frames. These special packets or frames are configured to pass through the legacy MAC 24, without a loss of the control information or other data. Toward this end the software device driver arrangement 20 includes a legacy MAC device driver 38 and an intermediate driver 40. The legacy MAC device driver 38 is a device-specific driver designed for interfacing with the application or operating system software 16 and the legacy MAC 24 to allow communication between the operating system and the legacy MAC. The legacy MAC device driver 38 thus functions as part of the system to produce suitably-formatted data received from a network through the legacy PHY 36 and passed through the legacy MAC 24.

The intermediate driver 40 is a PHY-device-specific driver as regards the network medium interface 32. However, the intermediate driver 40 may be device-independent regarding the legacy MAC 24. That is, the intermediate driver 40 may be compatible with a variety of legacy MACs and legacy MAC device drivers. It performs the function of interfacing with the network medium interface 32, and properly formatting and passing along data to be sent and received by the network medium interface. The intermediate driver 40 may appear "transparent" to the application or operating system software 16 and the legacy MAC device driver 38. That is, the application or operating system software 16 may operate as if it is interfacing directly with the legacy MAC device driver 38, and the MAC device driver may operate as if it is interfacing with the application or operating system software.

The network medium interface 32 includes a physical layer (PHY) 44 for sending and receiving signals along the network medium 14, and PHY control logic 48. The PHY control logic 48 interfaces with the intermediate driver 40, and coordinates control of the PHY 44. The PHY control logic 48 may include well-known components such as memory devices and processors.

The network medium interface 32 may include a MAC 50. The MAC 50 provides the media access control functions for the network interface 10 when the PHY 44 is used. It will be appreciated, however, that the MAC 50 may be omitted entirely from the network medium interface 32, with control of the PHY 44 being accomplished by the intermediate driver 40 through the passage of control information between the intermediate driver and the PHY control logic.

Control information is passed between the PHY control logic 48 and the intermediate driver 40 via special frames or packets which are of a form that they pass unobtrusively through the intervening parts of the network interface 10, such as the legacy MAC device driver 38, the legacy MAC 24, and the MII 30. The special frames or packets may have the format corresponding to that of a data frame or packet which would be transmitted or received by the network interface 10. Thus the special frames or packets may have fields which correspond to the fields in a data frame or packet, for example including information in fields corresponding to a destination address, a source address, a length and/or type of the frame, etc. The control information in the special frames or packets may be in the same position as data or payload is within a normal frame or packet. The control information in a special frame or packet sent from the intermediate driver 40 to the network medium interface 32 may contain a series of register addresses and register contents, the control information being used to alter registers of a component of the network medium interface 32. For example, the control information in the special frame may have the same form as that of control information from an EEPROM, and may be routed to an EEPROM or a device that is coupled to an EEPROM.

The control information in the special packets may include various kinds of information for internal use within the network interface 10. For example, the control information may include information regarding what transmit rates are to be used in transmitting data; information regarding the existence, identification, or capabilities of other network nodes; information regarding control of output drive characteristics (edge rate control on the network); and/or information regarding the internal operation of the network interface, including control information indicating the receipt of other special frames. The control information may be stored at its destination, for example in memory registers of the network control device 32 or the host computer 12.

The special frames or packets include identifiers which allow the part of the network interface 10 which is the desired destination of the special frame, either the intermediate driver 40 or the PHY control logic 48, to detect the special frames from among the normal data frames passing through the network interface 10. As described in greater detail below, the identifier may be a unique address in the source and/or destination address fields of the special frame.

It will be appreciated that the configuration of the network interface 10 shown in FIG. 1 and described above is merely exemplary, and that the network interface may have a different configuration if desired. For example, the intermediate driver 40 may alternatively be placed between the legacy MAC device driver 38 and the legacy MAC 24. The network medium interface 32 may alternatively have multiple MACs and/or PHYs.

It will be appreciated that a network interface 10 such as that shown in FIG. 1 and described above offers several advantages. It allows a network medium interface 32 to be incorporated into a network interface card 26 without requiring an entirely new device driver to be written. A single intermediate driver may be written which communicates with the network medium interface 32 as described above. Such an intermediate driver may be employed with a variety of legacy MACs and legacy MAC device drivers. Instead of requiring a new device driver to be written for every combination of legacy MAC and the new network medium interface 32, a single intermediate driver 40 may be used. Thus the network medium interface 32 may be integrated with a variety of legacy devices, at a relatively low cost.

The identifier for the special frames may use an otherwise unused IEEE address as a source or destination address. Alternatively, the special frames may utilize the IEEE address of the network interface card 26 or the network medium interface 32 as a destination address for special frames sent by the intermediate driver 40, and/or as a source address for special frames sent by the network medium interface 32. Another alternative identifier involves the special frame having a source address and a destination address which are the same. It will be appreciated that the PHY control logic 48 and the intermediate driver 40 may be configured to detect the foregoing identifiers.

In an exemplary embodiment, the network medium interface 32 is a device for interfacing with a telephone line network medium. The network medium interface 32 may include multiple PHYs and/or multiple MACs for sending and receiving data along the telephone line in a variety of formats and at a variety of different data rates. The control information passed between the interface driver 40 and the PHY control logic 48 may include information regarding speeds of data transmission, types and rates of data received, and data regarding various other network nodes. Thus the intermediate driver 40 may be configured to transmit data received from the application or operating system software 16 in a format compatible with formats used for networks involving a telephone wire network medium, for example, home phone networking alliance (HPNA) 1.0 or 2.0 specifications.

Because the special frames must pass through the existing legacy MAC 24, the special frames must meet any minimum frame length requirements for the legacy MAC. Thus it may be desirable for the intermediate driver 40 and the PHY control logic 48 to fill out the frame with additional data to avoid automatic padding of the special frame by the legacy MAC. For instance, the intermediate driver 40 may be configured to include repeated writes to a specific data register in order to increase the length of a special frame above a certain minimum level.

Figure 2:
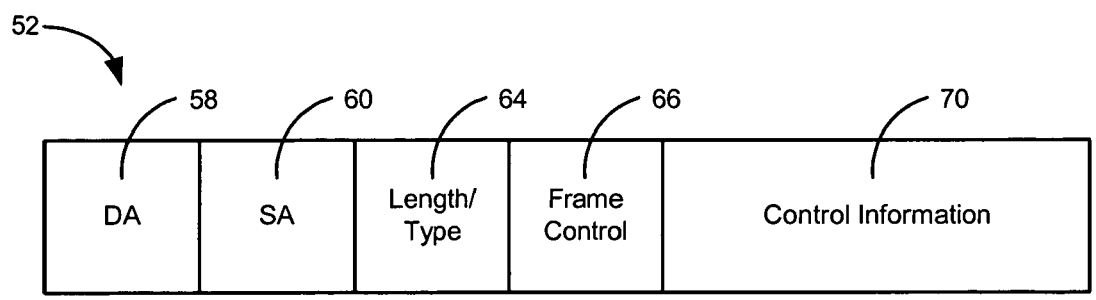
FIG. 2 is a diagram of a the format of a special frame used in internal communication within the network interface of FIG. 1.

Referring now to FIG. 2, the format of an exemplary special packet 52 is shown. The special frame 52 has a destination address field 58 and a source address field 60. As noted above, identifiers may be placed in one or both of these fields to enable the special frame to be recognized and treated as a special frame at its desired destination. The length-type field 64 and a frame control field 66, used in ordinary frames to pass along information about the frame and/or instructions regarding it, may also be "dummy" fields included for compatibility with the format expected by the legacy MAC 24. Alternatively, these fields may include data. A control information field 70 takes the place of the payload or data field in a ordinary frame.

The special frame 52 may also have other fields. For example, special frames sent from the network media interface 32 to the intermediate driver 40 may have fields or blocks corresponding to a preamble and a start frame delimiter (SFD) block, as would be expected by the legacy MAC 24. A cyclic redundancy check (CRC) or other type of FCS field may also be provided for example, special frames sent from the network media interface 32 to the intermediate driver 40. (It will be appreciated that the preamble, SFD and CRC will typically be added by the legacy MAC 24 to special frames sent by the intermediate driver to the network media interface 32.)

The above-described network interface is a means of connecting a network medium interface 32 to a legacy MAC 24, for instance in a network interface card 26, without a need to write a completely new device driver. The legacy MAC device driver 38 for use with the legacy MAC 24 may be supplemented by the intermediate driver 40, which communicates with the network medium interface 32. The network medium interface 32 may have one or more MACs of its own, in addition to a PHY device. The intermediate driver 40 and the PHY control logic 48 send control information from one to another across the legacy MAC 24 by use of special frames. Each of the intermediate driver 40 and the PHY control logic 48, the parts of the network interface 10 which communicate with one another internally to pass control information, may create special frames, which are sent across the legacy MAC 24 to the other part, and are identified by the other part through use of an identifier in the special frame. Upon identification the control information is extracted by the destination device, and is used in control of the network interface 10.

Figure 3:
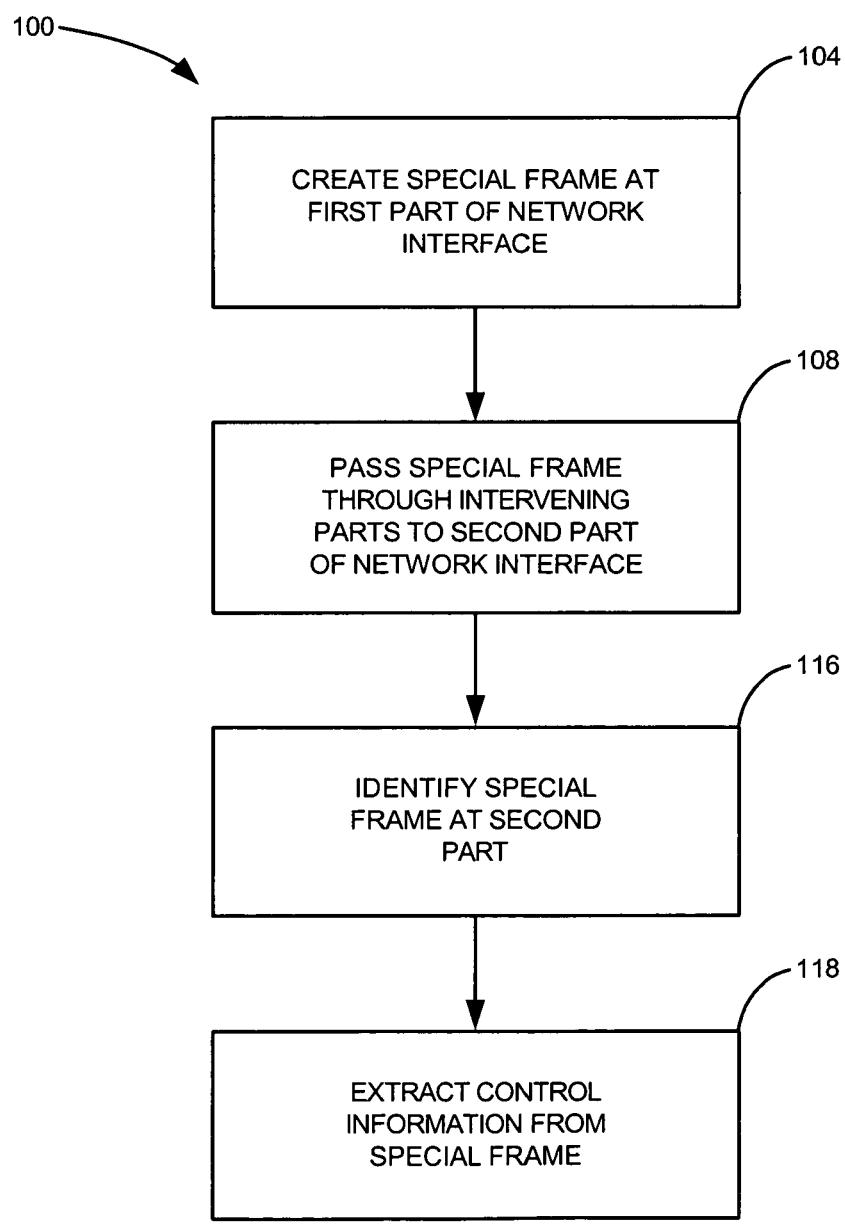
FIG. 3 is a flow chart illustrating the use of special frames within the network interface of FIG. 1.

Turning now to FIG. 3, a block diagram shows the steps of a method 100 for utilizing special frames. In step 104 a special frame is created in a first part of a network interface, such as the intermediate driver 40 or the network medium interface 32 of the network interface 10 shown in FIG. 1 and described above. In step 108 the special frame is passed through an intervening part or parts of the network interface 10, to a desired second (destination) part of the network interface. Examples of intervening parts are the legacy MAC 24 and the legacy MAC device driver 38, and the second part may be either the intermediate driver 40 or the network medium interface 32. The intervening part or parts of the network interface may add information to or remove information from the special frame, for example adding or removing headers. However, the special frame is formatted so as to pass through the intervening part or parts with its control information intact in a form which is extractable at the destination part of the network interface.

In step 116 the special frame is identified at the second (destination) part of the network interface through detection of the identifier. Finally, in step 118 the control information is extracted from the special frame and the information is utilized, for example by being stored in a memory device or by processed by a processor. An additional special frame may also be sent from the second part of the network interface to the first part to confirm receipt of the first special frame.

It will be appreciated that the intermediate driver 40 may utilize special frames to send a query to detect presence or absence of the network medium interface 32 or another interface which is capable of special frame support.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of communicating within a network interface apparatus, the method comprising:
   creating special frames for internal communication in a first part of the network interface apparatus, wherein the special frames each include:
      an identifier that distinguishes the special frames from other frames passing through the network interface apparatus; and
      physical layer device control information;
   sending the special frames from the first part to a second part of the network interface apparatus through at least a media access controller of the network interface apparatus, wherein the second part includes a physical layer device;
   identifying the special frames from among incoming frames incoming to the second part from the first part, wherein the identifying includes examining the incoming frames for the presence of the identifier; and
   extracting the physical layer device control information from the special frames at the second part.

2. The method of claim 1, wherein the creating includes creating the special frames with the identifier in the position of a destination address, and wherein the identifying includes examining destination addresses of the incoming frames.

3. The method of claim 2, wherein the identifier is an otherwise unused IEEE address that is not used by a currently-operating device.

4. The method of claim 1, further comprising controlling the physical layer device using the physical layer device control information.

5. The method of claim 1, wherein the extracting the physical layer device control information includes changing the contents of memory registers of the second part.

6. The method of claim 1, wherein the first part includes an intermediate driver capable of creating the special frames.

7. The method of claim 1, wherein the sending the special frames includes passing the special frames through a device driver.

8. The method of claim 1, further comprising creating additional special frames for internal communication in the second part, the additional special frames including an additional identifier, and passing the additional special frames to the first part.

9. The method of claim 8, wherein the identifier and the additional identifier are in the form of destination addresses.

10. The method of claim 8, wherein the identifier and the additional identifier are the same.

11. The method of claim 1, wherein the special frames are sent only within the network interface apparatus, and are not passed outside the network interface apparatus.

12. A network interface apparatus comprising:
   a network medium interface which includes a physical layer device;
   a media access controller operatively coupled to the network medium interface; and
   a device driver arrangement operatively coupled to the media access controller, the device driver arrangement including a device driver operatively configured to communicate with the media access controller, and an intermediate driver operatively configured to communicate control information to the network medium interface;
   wherein the intermediate driver and the network medium interface are operatively configured to communicate via special frames created for internal communication which include the control information.

13. The apparatus of claim 12, wherein the network medium interface includes a second media access controller, and a physical layer device operatively coupled to the second media access controller.

14. The apparatus of claim 13, wherein the special frames are formatted to pass through the second media access controller as if the special frames were data frames.

15. The apparatus of claim 12, wherein the special frames each include an identifier.

16. The apparatus of claim 15,
   wherein the identifier is placed in each of the special frames in a position corresponding to a destination address in a data frame; and
   wherein the identifier has the same format as the destination address.

17. The apparatus of claim 16, wherein the identifier is an otherwise unused IEEE address that is not used by a currently-operating device.

18. The apparatus of claim 12, wherein the intermediate driver is operatively between the device driver and the media access controller.

19. The apparatus of claim 12, wherein the device driver is operatively between the intermediate driver and the media access controller.

20. The apparatus of claim 12, wherein the network medium interface is configured to prevent passing of the special frames outside of the network interface apparatus.

21. A network interface apparatus comprising:
   a network medium interface which includes a physical layer device;
   a media access controller operatively coupled to the network medium interface;
   a device driver operatively configured to communicate with the media access controller; and means for controlling the physical layer device by passing control information through the media access controller, wherein the means for controlling includes means for creating and sending special frames for internal communication which include the control information.

22. The apparatus of claim 21, wherein the network medium interface includes a second media access controller operatively coupled to the physical layer device.

23. The apparatus of claim 21, wherein the means for crating the special frames for internal communication includes means for creating frames that are treated by the media access controller as data frames.

24. The apparatus of claim 21, wherein the network medium interface includes means for identifying the special frames.

25. The apparatus of claim 21, wherein the network medium interface is configured to prevent passing of the special frames outside of the network interface apparatus.

* * * * *

UNITED STATES PATENT AND TRADEMARK OFFICE
CERTIFICATE OF CORRECTION

PATENT NO. : 6,978,318 B1
DATED : December 20, 2005
INVENTOR(S) : Keller et al.

It is certified that error appears in the above-identified patent and that said Letters Patent is hereby corrected as shown below:

Column 9,
Line 10, replace "crating the special frames" with -- creating the special frames --.

Signed and Sealed this

Seventh Day of March, 2006

JON W. DUDAS
*Director of the United States Patent and Trademark Office*